Aug. 31, 1926.
B. R. EDWARDS
DETECTING DEVICE
Filed Jan. 5, 1926
1,598,565
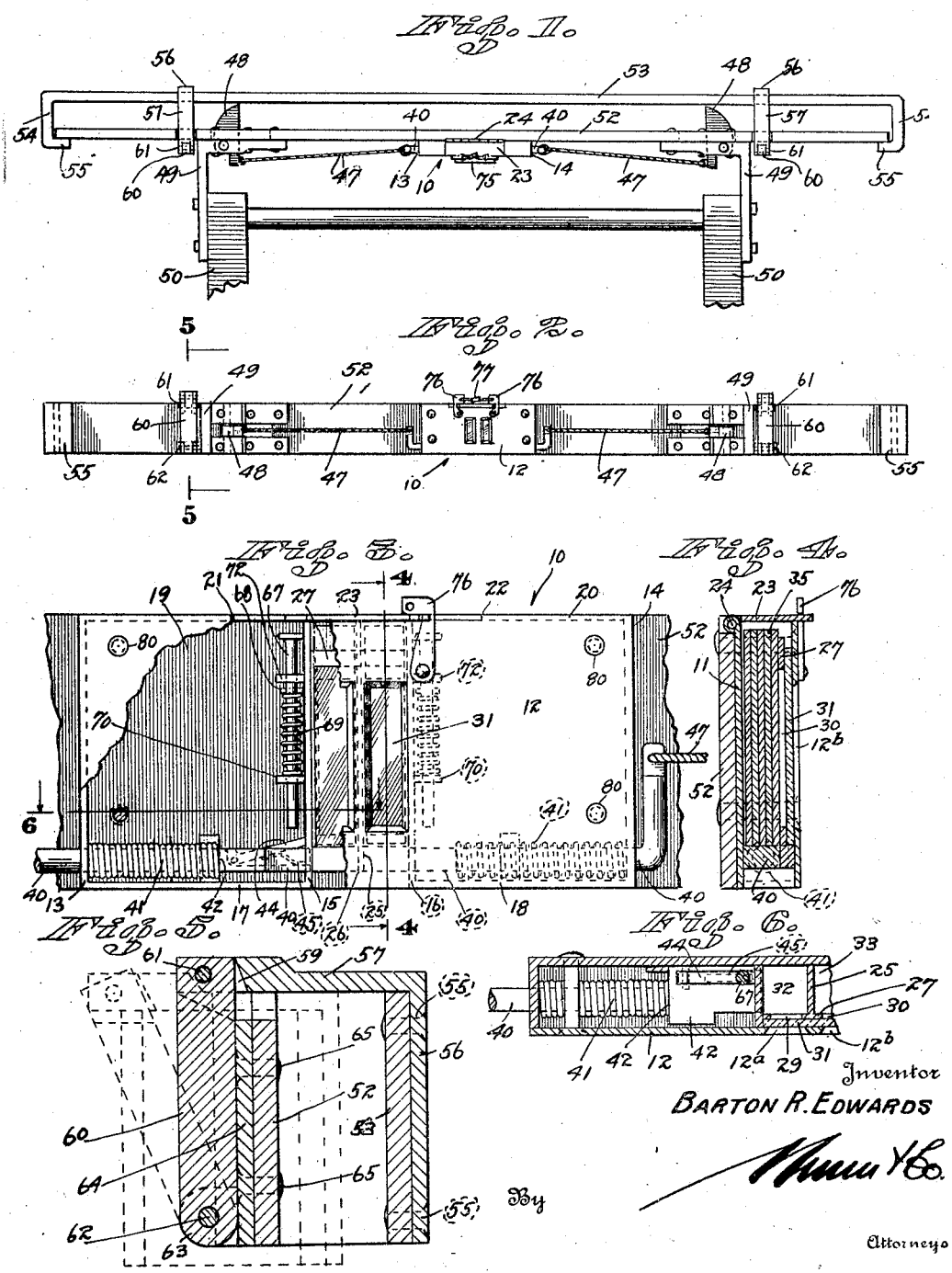
Inventor
BARTON R. EDWARDS Patented Aug. 31, 1926.

1,598,565

UNITED STATES PATENT OFFICE.

BARTON REEVES EDWARDS, OF BERKELEY, CALIFORNIA.

DETECTING DEVICE.

Application filed January 5, 1926. Serial No. 79,426.

This invention relates to detecting devices. The device which I have invented is to be secured to a vehicle such, for example, as an automobile.

An object of my invention is the provision of means for detecting an automobile driver who hits a person with his car, and drives on without caring for the injured person.

With the foregoing object in view, together with such other objects as may subsequently appear, this invention resides in the construction and arrangement of parts hereinafter described and claimed, and illustrated in the accompanying drawings, in which—

Figure 1 is a plan view of a bumper of an automobile, this bumper being of special construction, in combination with means for detecting a hit and run driver.

Figure 2 is an elevational view of part of the fender with part of the bumper shown in Figure 1 and the apparatus associated therewith.

Figure 3 is an elevational view of a device employed in my apparatus, the front of the device being partly broken away.

Figure 4 is a section taken on line 4—4 of Figure 3.

Figure 5 is a section taken on line 5—5 of Figure 2, and

Figure 6 is a section taken on line 6—6 of Figure 3.

Referring to the drawings for more detailed description thereof, the apparatus of my invention comprises a box 10 having a back 11, a front 12 and sides 13 and 14. The box also comprises partitions 15 and 16 spaced apart, parallel to each other, and parallel to the sides 13 and 14. These partitions extend from the top to the bottom of the box. A bottom member 17 extends from the front to the back of the box and from the side 13 to the partition 15. Another bottom member 18 extends from the front to the back of the box and from the side 14 to the partition 16. The box also comprises top members 19 and 20 extending inwardly from the sides 13 and 14 respectively and terminating respectively at points 21 and 22. The top members 19 and 20 are integral with the front 12 of the box.

The gap between the ends of the top members 19 and 20 is closed by top member 23 which is hinged to the back 11 of the box, the hinge being designated by the numeral 24 and clearly shown in Figures 1 and 4. Midway between the partitions 15 and 16 the partition 25 is disposed, this partition being parallel with the partitions 15 and 16 and extending from the top of the box to a point 26 near the bottom thereof, as shown in Figure 3. The partition 25 extends from the back of the box forwardly to a plate 27 which is transversely disposed to the partitions 15 and 16 and 25 and contacts with the partitions 15 and 16. The plate 27 extends from near the top of the partitions 15, 16 and 25 to the bottom of the partition 25, and is provided with apertures 29 and 30, best shown in Figure 6. The plate 27 is set in from the front edges of the partitions 15 and 16 so that a small pane of glass 31 may be disposed between the plate 25 and the front of the box. The front of the box is provided with spaced apertures 12ᵃ and 12ᵇ opposite the apertures 29 and 30 in the plate 25 and opposite the pane of glass. The partitions 15, 16 and 25, together with the plate 27 and the hinged top member 23 form compartments 32 and 33. These compartments are normally closed at their bottoms by means hereinafter described. The compartments 32 and 33 may be filled with oblong pieces of metal or slugs 35 shown in Figure 4. These metal pieces or slugs bear indicia for identifying the owner or driver of the vehicle, the indicia being for example the number of the license held by the owner or driver of the vehicle.

According to my invention, I provide means for allowing these identifying plates to drop out of the box when the automobile hits a person, such means being hereinafter described.

The device of my invention is intended to be under the control of the police authorities, who will place any desired number of identifying plates in each of the compartments 32 and 33 and record the number of identifying plates so placed, this number being preferably unknown to the owner of the vehicle to which the device of my invention is secured. When the plates fall on the road, one or more may be picked up by the person hit, if such person is not seriously injured; otherwise, the plates may be picked up by a policeman, or other person, who will return the identifying plates or checks to the police authorities. If the driver of the vehicle stops long enough to find all the plates, there is, of course, a greater probability of his being caught than if he does not stop to find them. Since the driver of the vehicle does not know how many identifying checks were placed by the police in the chambers 32 and 33, he will not know whether he has picked up all of them and, at least, it will be difficult to find some of the plates in the night time, which is the time when most of the hit and run accidents occur.

In the device of my invention I provide a pair of horizontal, slidable members 40. One of these horizontal members 40 slidably passes through the side 13 of the box and through the partition 15, while the other member 40 passes slidably through the side 14 of the box and through the partition 16. These members 40 are normally pressed inwardly with their inner ends contacting with opposite sides of the partitions 25. The means provided for so positioning the members 40 consists of a pair of coiled springs 41, each of which surrounds one of the members 40. The end of one of the coiled springs 41 bears against the inner face of the side 13 of the box, while its other end bears against an enlargement 42 of one of the members 40 and the other coiled spring has its ends bearing against the inner face of the side 14 of the box and against enlargement 42 of the other member 40.

It will thus be appreciated that the compartments 32 and 33 are normally closed at their bottoms by the inner end portions of the members 40. Grooves are formed in the upper sides of the members 40 in which grooves are pivotally mounted latches 44, to the under faces of which are secured flat springs 45 tending to push the latches upwardly. When the horizontal slidable members 40 close the bottoms of the compartments 32 and 33, the inner ends of the latches extend through the partitions 15 and 16, but when the members 40 are pulled outwardly as hereinafter described, the pivoted latches are pushed upwardly by the flat springs 45. The outer ends of the members 40 which are outside of the box are secured to ropes or chains 47, the outer ends of which are secured to ends of cams 48 which are pivoted to brackets 49 which are secured to frame members 50 of an automobile of other vehicle. The cams 48 pass through a rear bumper member 52, which is secured to the brackets 49. The device of my invention further comprises a front bumper member 53 which has its end portions 54 bent back and then bent inwardly at 55 to the rear and in contact with the rear fender member 52. To the front face of the forward bumper member 53 are secured by means of bolts 55 angular members 56 comprising horizontal portions 57, which extend rearwardly beyond the rear bumper member 52 and have their ends provided with slots 59 tapering rearwardly to receive the upper ends of members 60 which are pivoted by means of pins 61 in the slots 59, and which are pivoted at their lower ends by means of pins 62 between lugs 63 which extend rearwardly from plates 64 which are secured by means of bolts 65 to the face of the rear bumper member 52. It will be noted that the plates 64 are of the same height as the rear bumper member 52 and that the latter is of less height than the front bumper member 53. It will thus be seen that when the front bumper member 53 hits a person, the position taken by the front bumper member and the parts attached thereto is that shown in dotted lines in Figure 5. The rearward motion which the front bumper members 53 has when a person is hit moves the forward portions of the cams 48 inwardly so that the cams are effective to pull the ropes 47 outwardly. The pulling force on the ropes 47 is effective to pull the horizontal slidable rods 40 outwardly so that their inner ends are withdrawn from the compartments 32 and 33 whereby the identification means in the chambers 32 and 33 fall to the road. The outward motion of the rods 40 results, as previously described, in the latches 44 being pulled upwardly against the outer faces of the partitions 15 and 16 respectively, thus locking the rods 40 in their outermost positions, and preventing their return until the box is opened and the latches pressed back entirely into their respective slots by means of pins 67 to which are secured plates 68 which are normally pressed upwardly into the positions shown in Figure 3 by coiled springs 69 which encircle the pins and press on the plates 68 and on plates 70 through which the pins pass and which are secured to the back 11 of the box. The pins also pass through plates 72 which are secured to the back of the box. The hinged top portion 23 of the box has a tongue 75 provided at its ends with slots, each of which is engaged by a pivot member 76 secured to the front of the box. The upper portions of the members 76 are provided with apertures through which a chain is passed, the ends of the chain being locked together by means of a lock 77 shown in Figure 2. The box is thus locked to prevent its being tampered with and it is intended that keys to this lock shall be held only by the police authorities.

It will thus be appreciated that when the identification means have fallen out of their compartments, the bottoms of the compartments which consist of the inner end portions of the rods 40 cannot be placed back in condition, being locked by the latches 44 which cannot be returned to their normal position since the box is locked and the pins 67 cannot be operated. It will furthermore be realized that after the identification means have fallen from the box due to an accident, the fact that there are no identification means in the compartments 32 and 33 may be noted by the police authorities at a glance. The owner of the vehicle may then be required to account for the condition of the device which should have previously been reported to the authorities.

The back and front plates are provided with apertures so that the front of the box may be secured to the back thereof by means of rivets 80.

Although I have shown and described one embodiment of my invention, it is to be understood that the same is susceptible of various changes; and I reserve the right to employ such as may come within the scope of the appended claims.

I claim:

1. In combination, a movable bumper, identification means, means for holding the identification means, and means actuated by a movement of the bumper for releasing the identification means from the holding means, the last mentioned means comprising a cam actuated by a movement of said fender, a slidable rod actuated by said cam, an end of said rod forming the bottom of said holding means whereby said identification means are released when said rod is moved.

2. In combination, a movable bumper, identification means, means for holding the identification means, and means actuated by a movement of the bumper for releasing the identification means from the holding means, the last mentioned means comprising a slidable rod, an end of which forms the bottom of said holding means whereby said identification means are released when said rod is moved.

BARTON REEVES EDWARDS.